United States Patent
Song et al.

(10) Patent No.: US 9,854,956 B2
(45) Date of Patent: Jan. 2, 2018

(54) ROBOT CLEANER AND CONTROL METHOD THEREOF

(71) Applicant: SAMSUNG ELECTRONICS CO., LTD., Suwon-si, Gyeonggi-do (KR)

(72) Inventors: Jeong Gon Song, Gwangju (KR); Joo Sung Moon, Gwangju (KR); Kyung Hwan Yoo, Incheon (KR); Yeon Woo Lim, Siheung-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 617 days.

(21) Appl. No.: 14/212,041

(22) Filed: Mar. 14, 2014

(65) Prior Publication Data

US 2014/0283326 A1 Sep. 25, 2014

(30) Foreign Application Priority Data

Mar. 23, 2013 (KR) .................. 10-2013-0031203

(51) Int. Cl.
*G06F 19/00* (2011.01)
*A47L 11/40* (2006.01)
*A47L 9/28* (2006.01)
*G05D 1/02* (2006.01)

(52) U.S. Cl.
CPC ......... *A47L 11/4061* (2013.01); *A47L 9/2815* (2013.01); *A47L 9/2842* (2013.01); *A47L 9/2847* (2013.01); *A47L 9/2852* (2013.01); *A47L 11/4041* (2013.01); *A47L 11/4044* (2013.01); *G05D 1/0238* (2013.01); *A47L 2201/04* (2013.01); *G05D 2201/0203* (2013.01); *Y02B 40/82* (2013.01)

(58) Field of Classification Search
None
See application file for complete search history.

(56) References Cited

U.S. PATENT DOCUMENTS

| | | | | |
|---|---|---|---|---|
| 4,674,048 A | * | 6/1987 | Okumura | B25J 9/1676 318/568.12 |
| 5,377,106 A | * | 12/1994 | Drunk | G05D 1/0255 180/169 |
| 5,652,489 A | * | 7/1997 | Kawakami | G05D 1/0242 318/568.12 |

(Continued)

FOREIGN PATENT DOCUMENTS

| | | |
|---|---|---|
| CN | 1823672 | 8/2006 |
| KR | 10-1290379 | 7/2013 |
| WO | WO 2007/065030 A2 | 6/2007 |

OTHER PUBLICATIONS

Chinese Office Action dated Jul. 4, 2017 in related Chinese Application No. 201410104415.

*Primary Examiner* — Bhavesh V Amin
(74) *Attorney, Agent, or Firm* — Staas & Halsey LLP

(57) ABSTRACT

A robot cleaner includes a main body traveling along a floor surface and removing foreign substances in a cleaning travel mode, a sensor unit sensing obstacles around the main body, brush units sweeping foreign substances on a floor surface through rotation, and a controller reducing the traveling velocity of the main body and causing the main body to approach a front obstacle, if an area where a plurality of obstacles contacts each other is sensed by the sensor unit.

17 Claims, 19 Drawing Sheets

(56) References Cited

U.S. PATENT DOCUMENTS

| | | | | |
|---|---|---|---|---|
| 5,867,800 A * | 2/1999 | Leif | A47L 11/4011 | 180/167 |
| 5,942,869 A * | 8/1999 | Katou | B25J 5/00 | 318/568.12 |
| 6,076,025 A * | 6/2000 | Ueno | G05D 1/0219 | 701/23 |
| 6,429,016 B1 * | 8/2002 | McNeil | G01N 35/0099 | 414/222.02 |
| 7,211,980 B1 * | 5/2007 | Bruemmer | G05D 1/0214 | 318/567 |
| 9,043,021 B1 * | 5/2015 | Clark | G06Q 10/06311 | 700/101 |
| 2001/0056544 A1 * | 12/2001 | Walker | B60R 25/02 | 726/2 |
| 2003/0025472 A1 * | 2/2003 | Jones | G05D 1/0219 | 318/568.12 |
| 2003/0120389 A1 * | 6/2003 | Abramson | A47L 5/22 | 700/245 |
| 2005/0134440 A1 * | 6/2005 | Breed | B60N 2/2863 | 340/435 |
| 2007/0213892 A1 * | 9/2007 | Jones | A47L 11/00 | 701/23 |
| 2007/0234492 A1 * | 10/2007 | Svendsen | A47L 5/30 | 15/21.1 |
| 2007/0285041 A1 * | 12/2007 | Jones | G05D 1/0219 | 318/568.12 |
| 2008/0276407 A1 * | 11/2008 | Schnittman | A47L 11/34 | 15/319 |
| 2009/0292394 A1 * | 11/2009 | Hyung | G05D 1/027 | 700/251 |
| 2010/0037418 A1 * | 2/2010 | Hussey | A47L 5/30 | 15/319 |
| 2010/0049365 A1 * | 2/2010 | Jones | G05D 1/0219 | 700/253 |
| 2010/0257691 A1 * | 10/2010 | Jones | A47L 5/30 | 15/319 |
| 2012/0085368 A1 * | 4/2012 | Landry | A47L 9/2805 | 134/6 |
| 2013/0092190 A1 * | 4/2013 | Yoon | A47L 9/04 | 134/18 |
| 2014/0283326 A1 * | 9/2014 | Song | A47L 11/4041 | 15/319 |

* cited by examiner

ROBOT CLEANER AND CONTROL METHOD THEREOF

CROSS-REFERENCE TO RELATED APPLICATIONS

This application claims the benefit of Korean Patent Application No. 10-2013-0031203, filed on Mar. 23, 2013 in the Korean Intellectual Property Office, the disclosure of which is incorporated herein by reference.

BACKGROUND

1. Field

Embodiments of the present disclosure relate to a robot cleaner and a control method thereof.

2. Description of the Related Art

In general, a robot cleaner is an apparatus which removes foreign substances, such as dust, from a floor while spontaneously traveling about a region to be cleaned without user operation, and performs cleaning operation while traveling in a predetermined travel pattern. The robot cleaner may judge a distance from an obstacle, such as a piece of furniture, a wall, or an electric home appliance installed within a cleaning zone, through sensors and spontaneously change direction by selectively driving a left motor and a right motor.

SUMMARY

Therefore, it is an aspect of the present disclosure to provide a robot cleaner and a control method thereof which improve foreign substance removal ability at a corner in a cleaning travel mode.

Additional aspects of the disclosure will be set forth in part in the description which follows and, in part, will be apparent from the description, or may be learned by practice of the disclosure.

In accordance with one aspect of the present disclosure, a robot cleaner includes a main body, a driving unit moving the main body, a sensor unit sensing obstacles around the main body, and a controller reducing the traveling velocity of the main body and causing the main body to approach a front obstacle, if an area where a plurality of obstacles contacts each other is sensed through the sensor unit.

The controller may include a corner judgment unit judging that the area where a plurality of obstacles contacts each other is present in front of the main body, if one of a first side sensor and a second side sensor, and a front sensor simultaneously sense obstacles or if the first side sensor, the second side sensor, and the front sensor simultaneously sense obstacles, and a traveling velocity control unit reducing the current traveling velocity to a predetermined velocity, if the corner judgment unit judges that the area where a plurality of obstacles contacts each other is present in front of the main body.

The controller may further include a travel pattern control unit rotating the main body by a predetermined angle in the direction of a corner where the plurality of obstacles contacts each other, if the main body approaches the front obstacle.

The controller may further include a driving control unit increasing driving force of at least one of the rotating speed of side brush units, the suction force of a suction motor, and the rotating speed of a main brush unit, if the sensor unit senses the area where a plurality of obstacles contacts each other in front of the main body.

In accordance with another aspect of the present disclosure, a robot cleaner includes a main body, a sensor unit sensing obstacles around the main body, brush units sweeping foreign substances on a floor surface through rotation, and a controller reducing the traveling velocity of the main body and causing the main body to approach a front obstacle, if an area where a plurality of obstacles contacts each other is sensed by the sensor unit.

In accordance with another aspect of the present disclosure, a control method of a robot cleaner includes traveling a main body of the robot cleaner along a floor surface based on a normal cleaning travel pattern in a cleaning travel mode, sensing whether or not an area where a plurality of obstacles contacts each other is present in front of the main body through a sensor unit, and causing the main body to approach a front obstacle by reducing a traveling velocity, if the area where a plurality of obstacles contacts each other is present, as a result of sensing.

In accordance with a further aspect of the present disclosure, a robot cleaner includes a main body, a driving unit moving the main body, a front sensor sensing an obstacle located in a front region in the traveling direction of the main body, side sensors sensing obstacles located in side regions in the traveling direction of the main body, and a controller reducing the traveling velocity of the main body and causing the main body to approach a front obstacle, if the front sensor and the side sensors simultaneously sense obstacles.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts. In the following description of the present disclosure, a detailed description of known functions and configurations incorporated herein will be omitted when it may make the subject matter of the disclosure rather unclear. It will be understood that, although the terms first, second, etc. may be used herein to describe various elements, components, regions, layers and/or sections, these elements, components, regions, layers and/or sections should not be limited by these terms.

Hereinafter, reference will now be made in detail to the embodiments of the present disclosure, examples of which are illustrated in the accompanying drawings.

Figure 1:
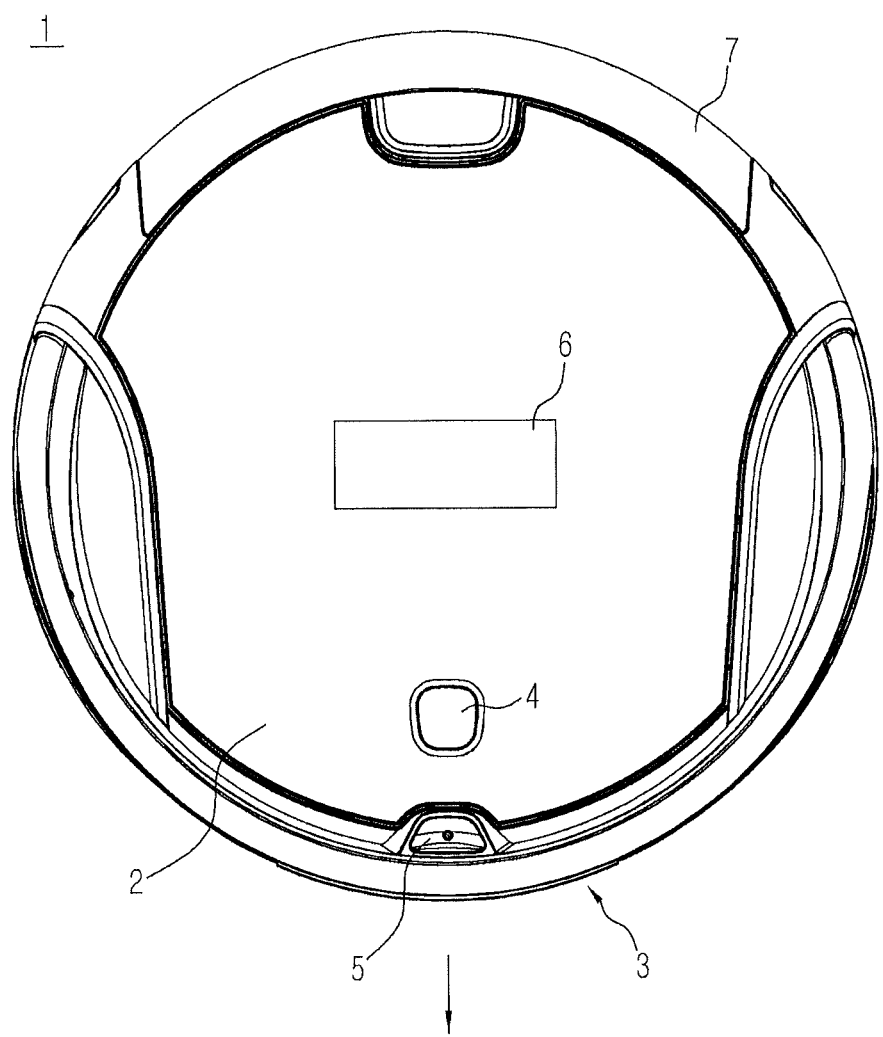
FIG. 1 is a plan view of a robot cleaner in accordance with one embodiment of the present disclosure.
Figure 2A:
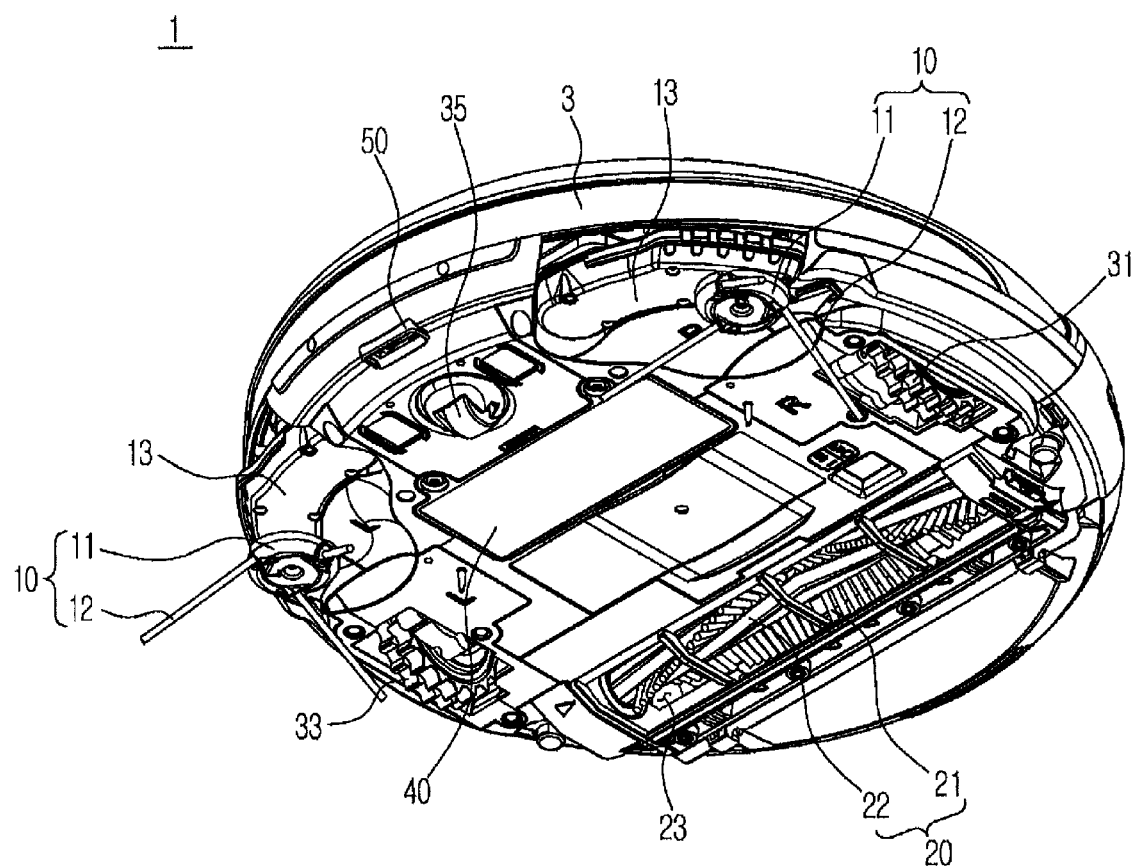
FIGS. 2A and 2B are perspective bottom views of the robot cleaner in accordance with the embodiment of the present disclosure.
Figure 2B:
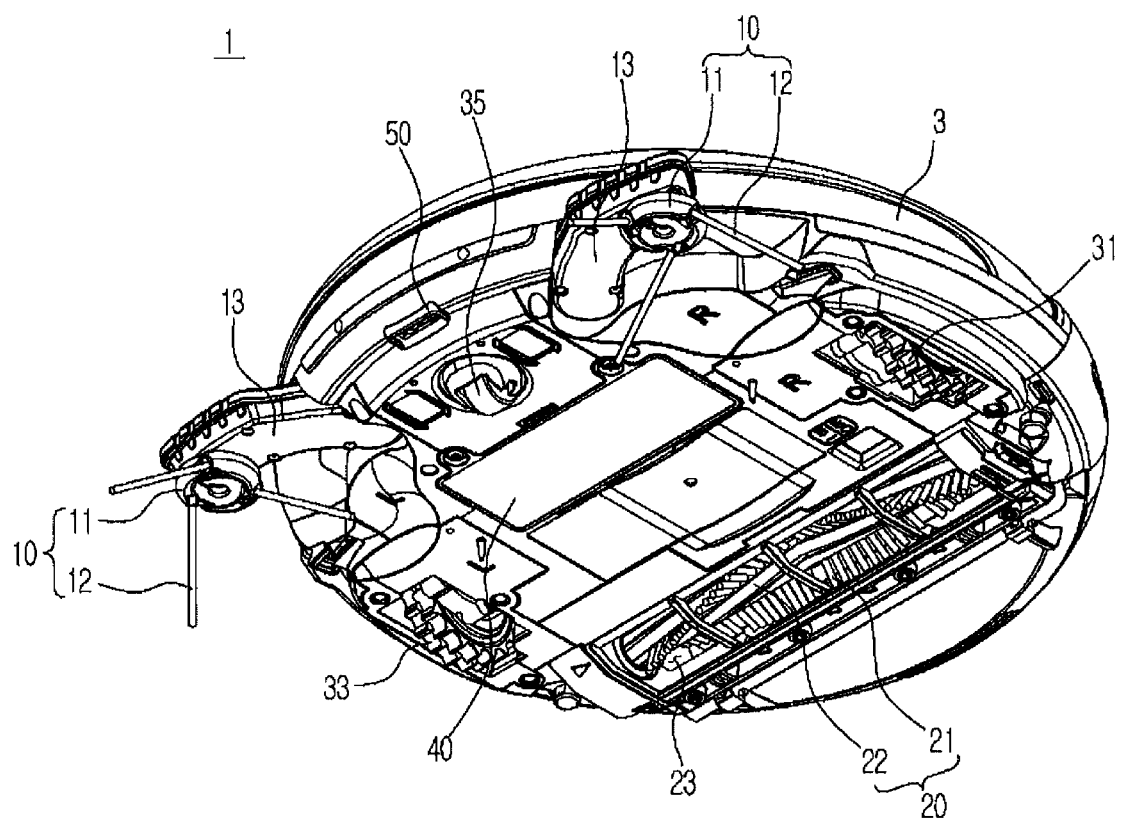
Figure 3:
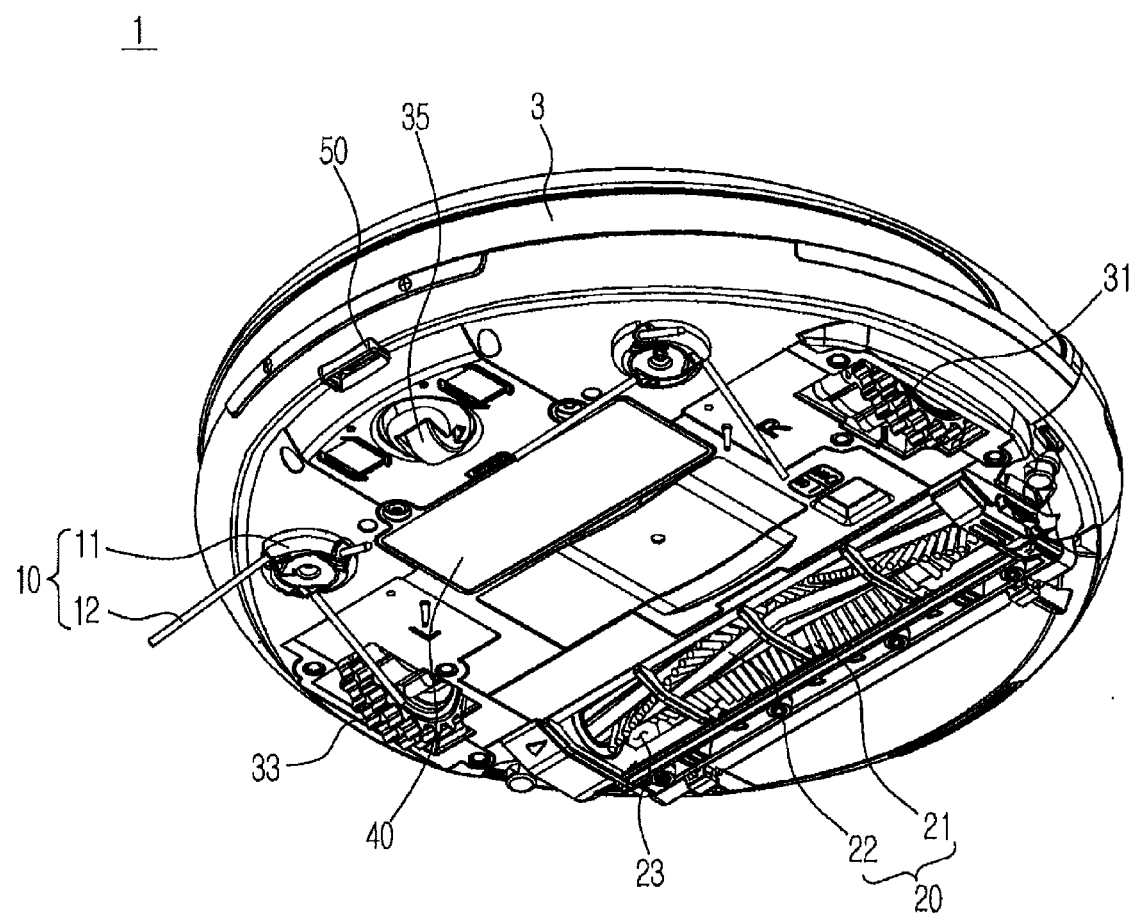
FIG. 3 is a perspective bottom view of a robot cleaner in accordance with another embodiment of the present disclosure.

FIG. 1 is a plan view of a robot cleaner in accordance with one embodiment of the present disclosure, FIGS. 2A and 2B are perspective bottom views of the robot cleaner in accordance with the embodiment of the present disclosure, and FIG. 3 is a perspective bottom view of a robot cleaner in accordance with another embodiment of the present disclosure.

As exemplarily shown in FIGS. 1 to 3, a robot cleaner 1 may include a main body 2, a sensor unit 3, a communication unit 5, a display 6, a dust collector 7, brush units 10 and 20, driving wheels 31, 33, and 35, a power supply unit 40, and a fall detection unit 50.

In more detail, the sensor unit 3 may sense obstacles present on a path in which the main body 2 travels. The sensor unit 3 may be provided as proximity sensors capable of recognizing a distance, but is not limited thereto. In addition, the robot cleaner 1 may further include a vision sensor 4 capable of recognizing a position to form a map for traveling of the robot cleaner 1.

The communication unit 5 allows the robot cleaner 1 to perform communication with external devices, such as a docking station (not shown) and a virtual guard (not shown). When a cleaning travel mode of the robot cleaner 1 has been completed or the remaining battery charge is below a reference value, the main body 2 docks with the docking station. The docking station may supply power to the main body 2. Further, the docking station may include a communication unit to transceive a docking signal with the main body 2 to guide docking of the main body 2. The virtual guard may serve as a virtual wall to discriminate a traveling limit area from other areas during traveling of the robot cleaner 1 and transmit an entry limit signal toward a connection passage between a current cleaning area and a specific area to prevent the robot cleaner 1 from entering the specific area.

The display 6 may be formed at one side of the main body 2 and display various states of the robot cleaner 1. For example, the display 6 may display a state of charge of a battery, whether or not the dust collection unit 7 is full of dust, or the cleaning travel mode or idle mode of the robot cleaner 1.

The dust collection unit 7 may collect foreign substances, such as dust gathered through the brush units 10 and 20 and introduced through an inlet 23.

The brush units 10 and 20 may include side brush units 10 and a main brush unit 20. The side brush units 10 may expand a cleaning area through rotation. The side brush units 20 are installed on both side surfaces of the front portion of the main body 2 and rotated horizontal to the floor surface, but the rotating direction and installation position of the side brush units 20 on the main body 2 are not limited thereto. Further, the side brush unit 10 may include a rotary shaft 11 and a side brush 12. Here, the side brush units 10 may be protrusion type side brush units or fixed type side brush units. As exemplarily shown in FIGS. 2A and 2B, the protrusion type side brush units 10 have a structure in which the rotary shaft 11 and the side brush 12 may protrude from the main body 2 (in FIG. 2B) and retract into the main body 2 (in FIG. 2A) through a side arm 13 mounted on the main body 2. Further, as exemplarily shown in FIG. 3, the fixed type side brush units 10 have a structure in which a side brush 12 is formed on a rotary shaft 11 attached to a main body 2 and is thus fixed to the main body 2.

The main brush unit 20 may be attached to the inlet 23 formed on the lower surface of the main body 2. The main brush unit 20 may include a main brush 21 and a roller 22. The main brush 21 may be formed on the outer surface of the roller 22. As the roller 22 is rotated, the main brush 21 may scatter dust accumulated on the floor surface and guide the dust to the inlet 23. The main brush 21 may be formed of a material having elasticity.

The driving wheels 31, 33, and 35 may be formed at symmetrical positions at left and right edges of the central region of the lower surface of the main body 2 and formed at the front region of the lower surface of the main body 2. However, the positions of the driving wheels 31, 33, and 35 are not limited thereto, and the driving wheels 31, 33, and 35 may be mounted at different regions according to operator necessity. The driving wheels 31, 33, and 35 may be moved in various directions, such as forward movement, backward movement, or rotation, in the cleaning travel mode of the main body 2 and receive moving force through wheel motors (not shown). Among the above-described driving wheels 31, 33, and 35, the driving wheel 35 may be formed at the front region of the lower surface of the main body 2 and rotated according to the state of the floor surface on which the main body 2 travels so that the angle of the driving wheel 35 may be changed. The driving wheel 35 may be used to stabilize the pose of the main body 2 and to prevent the main body 2 from falling, support the robot cleaner 1, and be a roller or caster type wheel. Further, the driving wheels 31, 33, and 35 may be modularized and thus be detachably mounted on the lower surface of the main body 2 through a method, such as hook combination, screw combination, or fitting.

The power supply unit 40 is an apparatus of supplying power to drive the main body 2 and may include a driving unit to drive various parts mounted on the main body 2 in addition to the main body 2 and a battery electrically connected to the driving unit and supplying power to the driving unit. The battery may be a rechargeable secondary battery and be charged with power supplied from the docking station (not shown) if the main body 2 has completed the cleaning travel mode and then docks with the docking station (not shown).

The fall detection unit 50 may prevent the main body 2 from falling and include a plurality of sensors (not shown).

Figure 4:
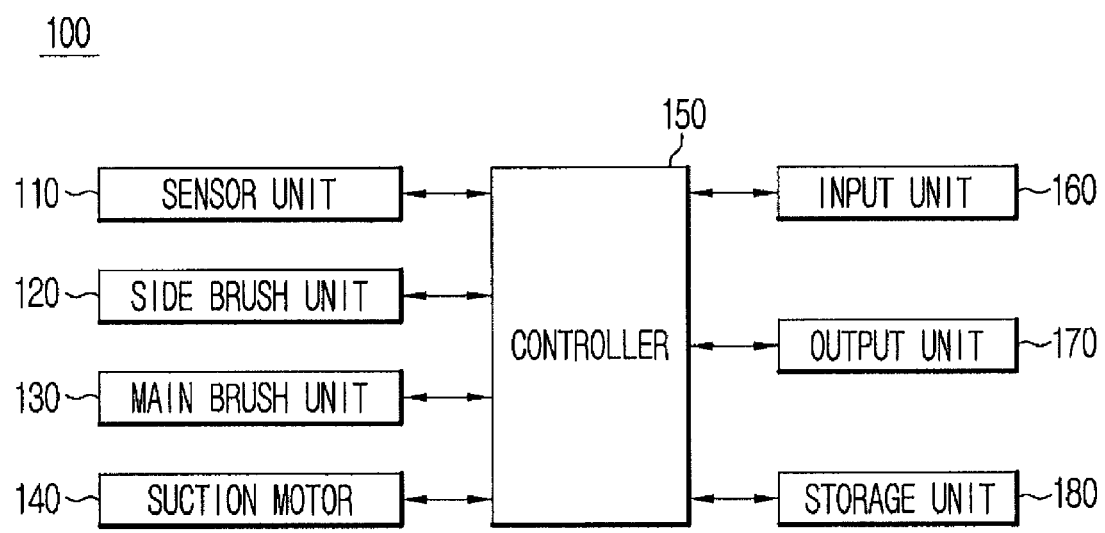
FIG. 4 is a block diagram illustrating the configuration of a robot cleaner in accordance with one embodiment of the prevent disclosure in detail.
Figure 5:
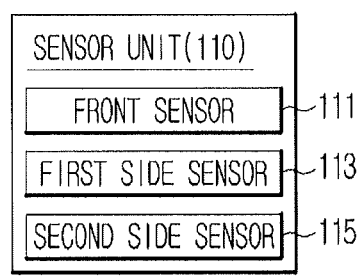
FIG. 5 is a block diagram illustrating the configuration of a sensor unit of FIG. 4 in detail.
Figure 6:
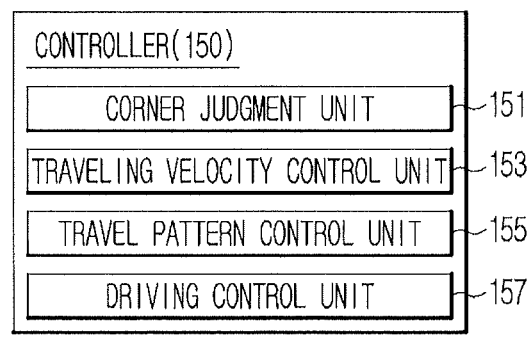
FIG. 6 is a block diagram illustrating the configuration of a controller of FIG. 4 in detail.

FIG. 4 is a block diagram illustrating the configuration of a robot cleaner in accordance with one embodiment of the prevent disclosure in detail, FIG. 5 is a block diagram illustrating the configuration of a sensor unit of FIG. 4 in detail, and FIG. 6 is a block diagram illustrating the configuration of a controller of FIG. 4 in detail.

Figure 7A:
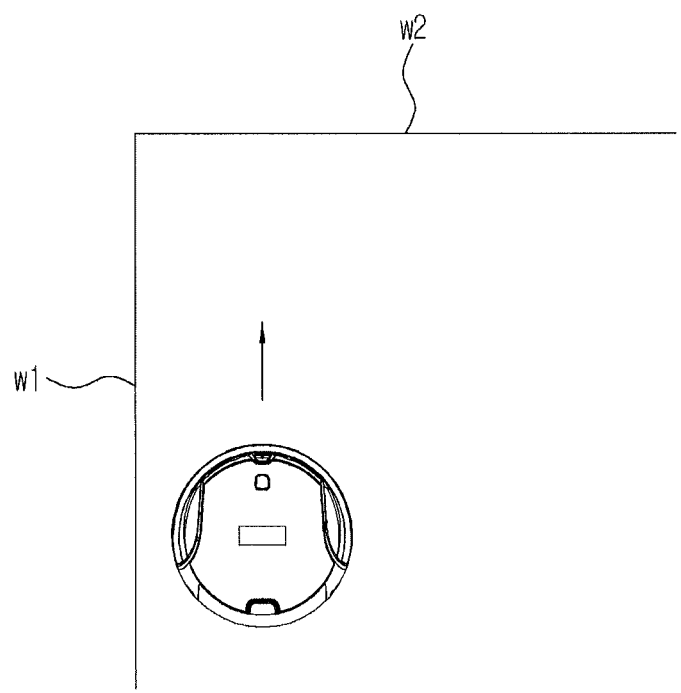
FIGS. 7A to 7D are views illustrating one example of operation of the robot cleaner in accordance with the embodiment of the present disclosure.
Figure 7B:
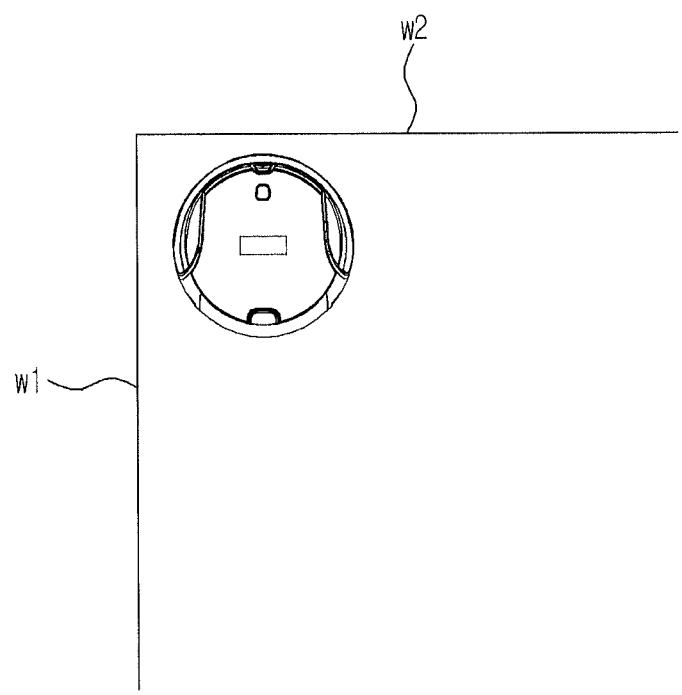
Figure 7C:
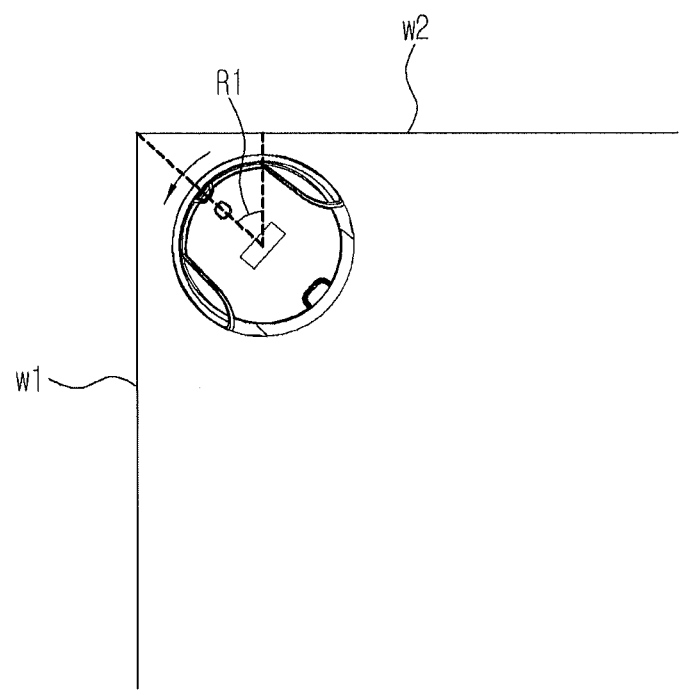
Figure 7D:
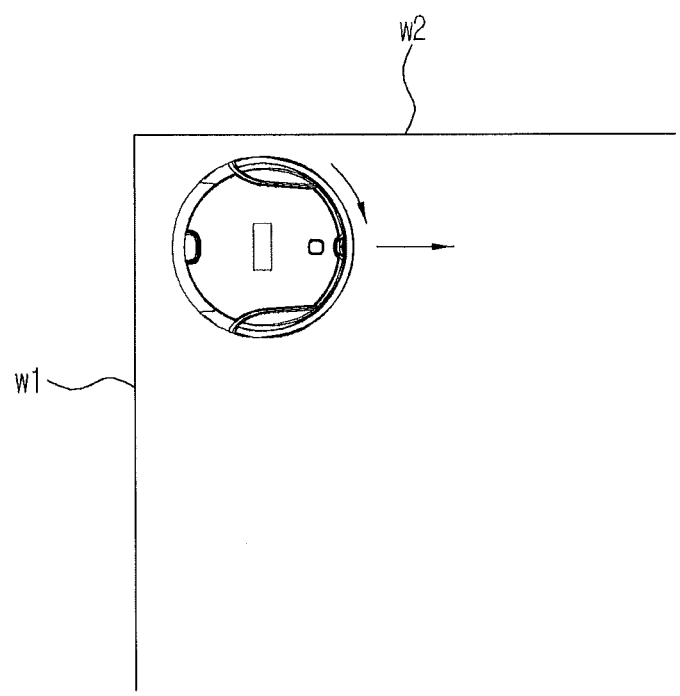
Figure 8A:
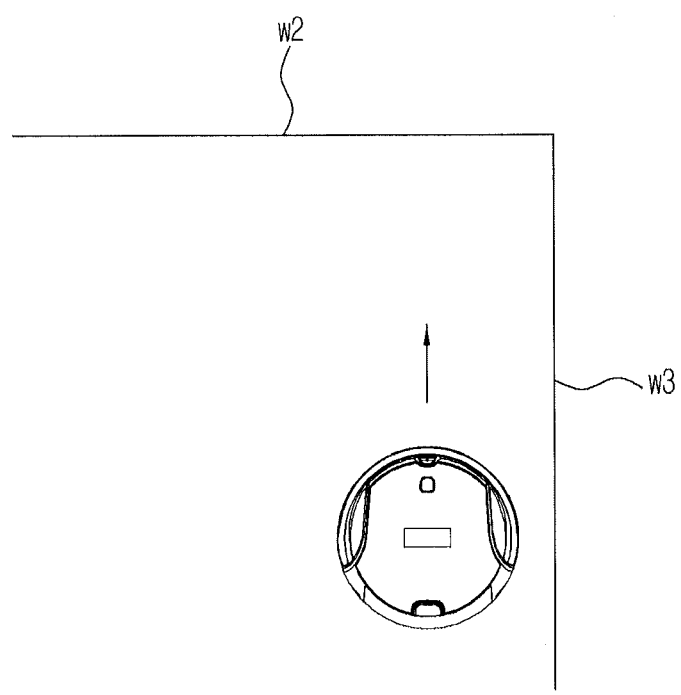
FIGS. 8A to 8D are views illustrating another example of operation of the robot cleaner in accordance with the embodiment of the present disclosure.
Figure 8B:
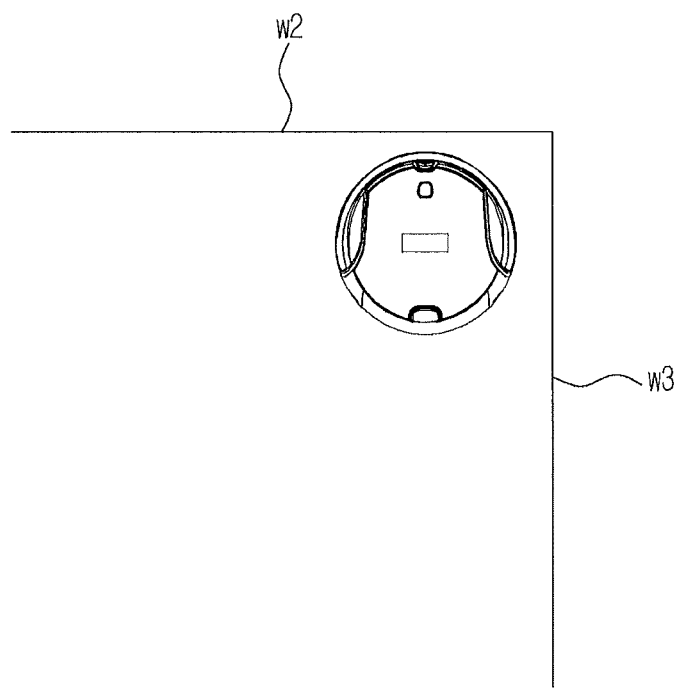
Figure 8C:
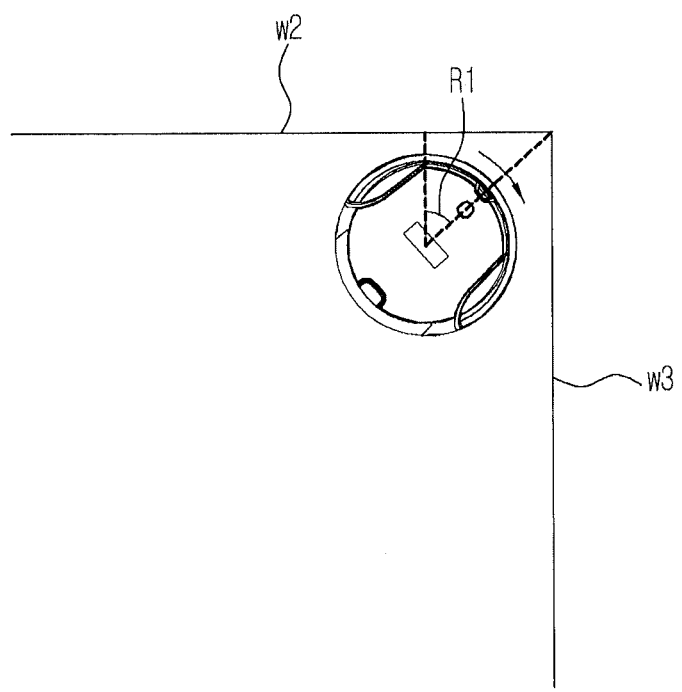
Figure 8D:
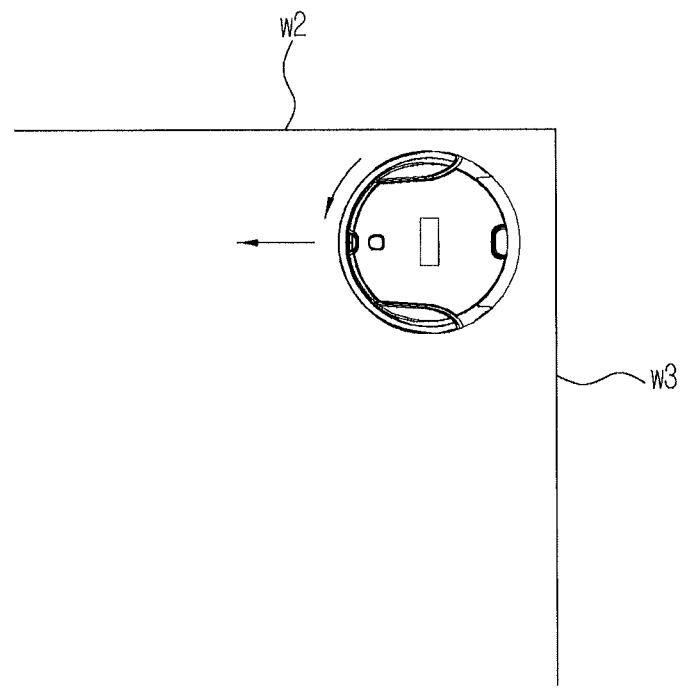
Figure 9A:
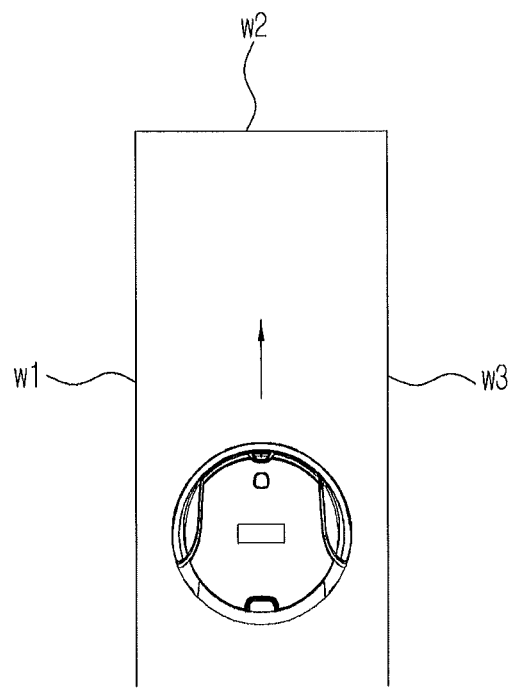
FIGS. 9A to 9C are views illustrating a further example of operation of the robot cleaner in accordance with the embodiment of the present disclosure.
Figure 9B:
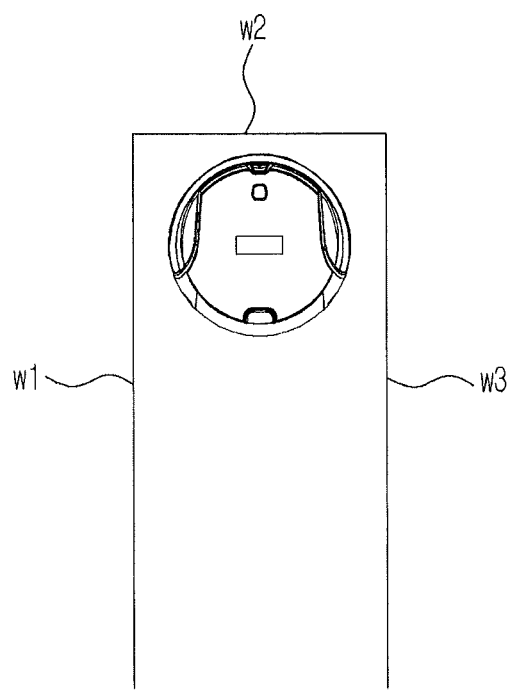
Figure 9C:
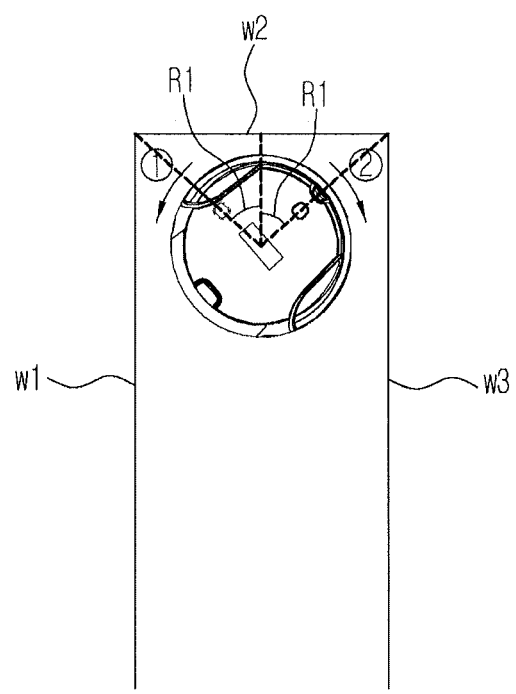

Here, the configuration of the robot cleaner will be described with reference to FIGS. 7A to 7D illustrating one example of operation of the robot cleaner, FIGS. 8A to 8D illustrating another example of operation of the robot cleaner, and FIGS. 9A to 9C illustrating a further example of operation of the robot cleaner.

As exemplarily shown in FIG. 4, the robot cleaner 100 may include a sensor unit 110, brush units including side brush units 120 and a main brush unit 130, a suction motor 140, a controller 150, an input unit 160, an output unit 170, and a storage unit 180.

The sensor unit 110 may sense obstacles around the main body 2 and include a front sensor 111 sensing an obstacle located in a front region in the traveling direction of the main body 2 and side sensors 113 and 115 sensing obstacles located in side regions in the traveling direction of the main body 2, as exemplarily shown in FIG. 5. Here, the side sensors 113 and 115 may include a first side sensor 113 formed on the left side surface among both side surfaces of the main body 2 and a second side sensor 115 formed on the right side surface among both side surfaces of the main body 2. However, the side sensors are not limited thereto, and may include a plurality of sensors provided at different positions according to operator necessity. The above-described main body 2 may travel along the floor surface in the cleaning travel mode and thus remove foreign substances from the floor surface.

The brush units may sweep foreign substances on the floor surface through rotation and include the side brush units 120 and the main brush unit 130. The side brush units 120 may be installed on both side surfaces of the front portion of the main body 2 and rotated horizontal to the floor surface. Each of the side brush units 120 may include a rotary shaft 11 and a side brush 12, but is not limited thereto. The side brush 12 may be rotated about the rotary shaft 11 and serve to sweep foreign substances on the floor surface on which the robot cleaner 1 travels toward the inlet 23.

The side brush units 120 may be protrusion type side brush units or fixed type side brush units. As exemplarily shown in FIGS. 2A and 2B, the protrusion type side brush units have a structure in which the rotary shaft 11 and the side brush 12 may protrude from the main body 2 and retract into the main body 2 through a side arm 13 mounted on the main body 2. Further, as exemplarily shown in FIG. 3, the fixed type side brush units have a structure in which the side brush 12 is formed on the rotary shaft 11 mounted to the main body 2 and is thus fixed to the main body 2. The rotary shaft 11 may be rotated through a brush motor (not shown).

The main brush unit 130 is formed on the lower surface of the main body 2 and is rotated on the floor surface in a roller type. The main brush unit 130 may include a main brush 21 formed at the inlet 23 of the lower surface of the main body 2 and sweeping or scattering foreign substances on the floor surface and a roller 22 rotating the main brush 21. Here, the roller 22 may be rotated by a brush motor (not shown).

If an area where a plurality of obstacles contacts each other is sensed through the sensor unit 110, the controller 150 may reduce the traveling velocity of the main body 2 and allow the main body 2 to approach a front obstacle. That is, if the robot cleaner 100 senses an area where a plurality of obstacles contacts each other (for example, a corner) during traveling for cleaning, the controller 150 reduces the current traveling velocity so as to more effectively remove foreign substances from the corner. Here, the front obstacle may mean an obstacle located in a front region in the traveling direction of the robot cleaner 1 among the plurality of obstacles contacting or adjoining each other to form a designated angle.

Further, if the robot cleaner 100 simultaneously senses obstacles through the front sensor 111 and the side sensors 113 and 115, the controller 150 reduces the traveling velocity of the main body 2 so that the main body 2 may approach the front obstacle.

In more detail, as exemplarily shown in FIG. 6, the controller 150 may include a corner judgment unit 151, a traveling velocity control unit 153, a travel pattern control unit 155, and a driving control unit 157.

The corner judgment unit 151 may judge that an area where a plurality of obstacles contacts each other is present in front of the main body 2, if one of the first side sensor 113 and the second side sensor 115, and the front sensor 111 simultaneously sense obstacles or if the first side sensor 113, the second side sensor 115, and the front sensor 111 simultaneously sense obstacles. For example, if the front sensor 111 and the first side sensor 113 simultaneously sense a front wall surface W2 and a left wall surface W1, as exemplarily shown in FIG. 7A, or if the front sensor 111 and the second side sensor 113 simultaneously sense a front wall surface W2 and a right wall surface W3, as exemplarily shown in FIG. 8A, the corner judgment unit 151 may judge that an area where a plurality of obstacles contacts each other is present in front of the main body 2. Further, if the front sensor 111, the first side sensor 113, and the second side sensor 115 simultaneously sense a front wall surface W2, a left wall surface W1, and a right wall surface W3, as exemplarily shown in FIG. 9A, the corner judgment unit 151 may judge that an area where a plurality of obstacles contacts each other is present in front of the main body 2. Here, a wall surface means one surface of each of all obstacles present within an area which the robot cleaner 100 cleans, and may be one surface of a piece of furniture or one surface of an electric home appliance. Further, the area where a plurality of obstacles contacts each other may be a corner where a plurality of obstacles contacts or adjoins each other to form a designated angle and be defined as an area, removal of foreign substances from which in the normal cleaning travel mode is difficult. The above-described obstacles may include all objects which may be disposed within a cleaning zone, such as a wall, a piece of furniture, or an electric home appliance.

The traveling velocity control unit 153 may reduce the current traveling velocity to a predetermined velocity, if the corner judgment unit 151 judges that an area where a plurality of obstacles contacts each other is present in front of the main body 2. Here, the reduced velocity may be the velocity of a pattern in which a predetermined velocity is uniformly maintained or the velocity of a pattern in which a velocity is changed according to approach distances from a front obstacle. However, the reduced velocity is not limited thereto, and the velocities of various patterns may be used according to operator necessity.

For example, the traveling velocity control unit 153 controls traveling of the main body 2 from a point where the robot cleaner 100 senses an area where a plurality of front obstacles contacts each other in front of the main body 2, as exemplarily shown in FIG. 7A, 8A, or 9A, to a point where the robot cleaner 100 approaches a front wall surface, as exemplarily shown in FIG. 7B, 8B, or 9B, at a predetermined reduced velocity. As the robot cleaner 100 travels at the reduced velocity, the robot cleaner 100 stays in the area where the plurality of obstacles contacts each other for a long time, as compared to a conventional robot cleaner, and a foreign substance removal time in the area where the plurality of obstacles contacts each other may be increased.

If the main body 2 approaches a front obstacle, the travel pattern control unit 155 may rotate the main body 2 by a predetermined angle in the direction of a corner where the plurality of obstacles contacts each other. Here, the travel pattern control unit 155 may rotate the main body 2 by the predetermined angle in the leftward direction (with reference to FIG. 7C), if the area where the plurality of obstacles contacts each other is located to the left of the traveling direction of the main body 2, and may rotate the main body 2 by the predetermined angle in the rightward direction (with reference to FIG. 8C), if the area where the plurality of obstacles contacts each other is located to the right of the traveling direction of the main body 2. If the area where the plurality of obstacles contacts each other is located to both the left and the right of the traveling direction of the main body 2, the travel pattern control unit 155 may rotate the main body 2 by the predetermined angle in one of the leftward direction and rightward direction, and then rotate the main body 2 by the predetermined angle in the other direction (with reference to FIG. 9C).

The predetermined angle means an angle by which the side brush 12 of the main body 2 is rotated in the direction of a corner so as to pass by the area where the plurality of obstacles contacts each other and may be arbitrarily set by an operator. For example, as exemplarily shown in FIGS. 7C, 8C, and 9C, the main body 2 may be rotated by R1 in the direction of a corner.

When the main body 2 approaches the area where the plurality of obstacles contacts each other under the condition that the main body 2 travels straight while tracking the side walls W1 and W3 in such a manner, the main body 2 is rotated in the direction of a corner so that the side brush 12 may further approach the corner, thus more effectively foreign substances at the corner.

The travel pattern control unit 155 may maintain the main body 2 in the rotated state in the direction of the corner for a predetermined waiting time and then travel the main body 2 according to a normal cleaning travel pattern. For example, as exemplarily shown in FIGS. 7D and 8D, the travel pattern control unit 155 may travel the main body 2, which has completed cleaning of the area where the plurality of obstacles contacts each other, according to the normal cleaning travel pattern. Here, the normal cleaning travel pattern may be defined as a cleaning travel pattern except for the case that a specific cleaning travel pattern is used due to sensing of obstacles, such as in the area where the plurality of obstacles contacts each other, or occurrence of an unpredicted situation during traveling for cleaning.

If the sensor unit 110 senses an area where a plurality of obstacles contacts each other in front of the main body 2, the driving control unit 157 may increase driving force of at least one of the rotating speed of the side brush units 120, the suction force of the suction motor 140, and the rotating speed of the main brush unit 130. The suction motor 140 may suck foreign substances.

The input unit 160 may input a signal to execute the cleaning travel mode to the robot cleaner 100. The output unit 170 may output various pieces of information regarding the robot cleaner 10 including a state of charge of the battery, whether or not the dust collection unit 7 is full of dust, and the cleaning travel mode or idle mode of the robot cleaner 1, and these pieces of information may be displayed through the display 6. Further, the storage unit 180 may store information regarding the robot cleaner 100. Although not shown in the drawings, the driving unit may move the main body 2 through the driving wheels.

Figure 10:
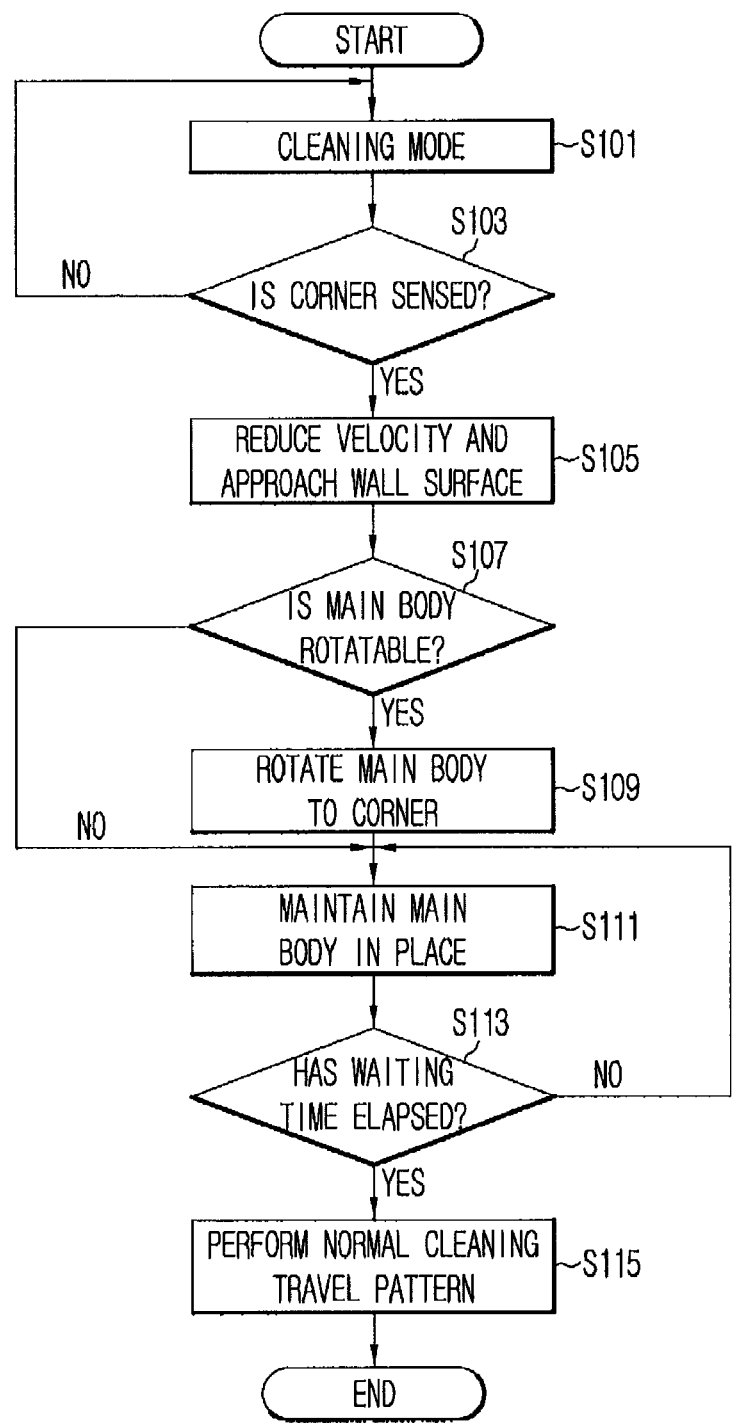
FIG. 10 is a flowchart illustrating a control method of a robot cleaner in accordance with one embodiment of the present disclosure.

FIG. 10 is a flowchart illustrating a control method of a robot cleaner in accordance with one embodiment of the present disclosure. The control method will be described with reference to FIGS. 1 to 9.

First, in the cleaning travel mode of the robot cleaner 1, the main body 2 of the robot cleaner 1 may travel along a floor surface based on a normal cleaning travel pattern (Operation S101). The normal cleaning travel pattern may be defined as a cleaning travel pattern except for the case that a specific cleaning travel pattern is used due to sensing of obstacles, such as in an area where a plurality of obstacles contacts each other, or occurrence of an unpredicted situation during traveling for cleaning.

Thereafter, whether or not there is an area where a plurality of obstacles contacts each other in front of the main body 2 may be sensed through the sensor unit 110 (Operation S103). The sensor unit 110 may include a front sensor 111 sensing an obstacle in front of the main body 2 of the robot cleaner 1, a first side sensor 113 formed at the left side of the main body 2 of the robot cleaner 1, and a second side sensor 115 formed at the right side of the main body 2 of the robot cleaner 1.

The robot cleaner 1 may judge that an area where a plurality of obstacles contacts each other is present in front of the main body 2, if one of the first side sensor 113 and the second side sensor 115, and the front sensor 111 simultaneously sense obstacles, or if the first side sensor 113, the second side sensor 115, and the front sensor 111 simultaneously sense obstacles. For example, if the robot cleaner 1 recognizes presence of an obstacle in front of the main body 2 through the front sensor 111 while tracking a side wall, the robot cleaner 1 may judge that an area where a plurality of obstacles contacts each other is present.

Here, the area where a plurality of obstacles contacts each other is a corner where a plurality of obstacles contacts each other to form a designated angle may be a corner and be defined as an area, removal of foreign substances from which in the normal cleaning travel mode is difficult. The above-described obstacles may include all objects which may be disposed within a cleaning zone, such as a wall, a piece of furniture, and an electric home appliance.

As a result of sensing in Operation 103, if the area where a plurality of obstacles contacts each other is present in front of the main body 2, the robot cleaner 100 may reduce a traveling velocity and approach the front obstacle (Operation S105). As a result of sensing in Operation 103, if the area where a plurality of obstacles contacts each other is not present in front of the main body 2, the robot cleaner 1 may continuously execute the normal cleaning travel mode.

In Operation S105, the robot cleaner 1 may control the velocity thereof so that the main body 2 may approach the front obstacle while uniformly maintaining a predetermined velocity or control the velocity thereof so that the velocity of the main body 2 may be changed according to approach distances from the front obstacle, but is not limited thereto. For example, if it is sensed that the area where a plurality of obstacles contacts each other is present in front of the main body 2, the robot cleaner 1 may reduce the current traveling velocity, and then approach the front obstacle at the same reduced traveling velocity or approach the front obstacle while gradually reducing the traveling velocity as the robot cleaner 1 is closer to the front obstacle.

Thereafter, the robot cleaner 1 may confirm whether or not a space in which the main body 2 is rotatable in the direction of the corner is present (Operation S107).

As a result of confirmation, if the space in which the main body 2 is rotatable is present, the robot cleaner 1 may rotate the main body 2 by a predetermined angle in the direction of a corner where the plurality of obstacles contacts each other (Operation S109). Since Operation S107 may be omitted, rotation of the main body 2 in the direction of the corner may be performed under the condition that whether or not the space in which the main body 2 is rotatable is present is not confirmed.

In Operation S109, the robot cleaner 1 may rotate the main body 2 by a predetermined angle in the leftward direction (with reference to FIG. 7C), if the area where the plurality of obstacles contacts each other is located to the left of the traveling direction of the main body 2, and may rotate the main body 2 by the predetermined angle in the rightward direction (with reference to FIG. 8C), if the area where the plurality of obstacles contacts each other is located to the right of the traveling direction of the main body 2. Further, if the area where the plurality of obstacles contacts each other is located to both the left and right of the traveling direction of the main body 2, the robot cleaner 1 may rotate the main body 2 by the predetermined angle in one of the leftward direction and rightward direction, and then rotate the main body 2 by the predetermined angle in the other direction (with reference to FIG. 9C). The predetermined angle means an angle by which the side brush 12 of the main body 2 is rotated in the direction of a corner so as to pass by the area where the plurality of obstacles contacts each other and may be arbitrarily set by an operator. For example, as exemplarily shown in FIGS. 7C, 8C, and 9C, the main body 2 may be rotated by R1 in the direction of the corner.

In Operation S109, the robot cleaner 1 may maintain the main body 2 in the rotated state for a predetermined waiting time, and travel the main body 2 according to a normal cleaning travel pattern when the predetermined waiting time has elapsed (Operations S111~S115). In Operation S113, if the predetermined waiting time has not elapsed, the robot cleaner 1 may perform Operation S111.

For example, as exemplarily shown in FIGS. 7D and 8D, the robot cleaner 1 may travel the main body 2, which has completed cleaning of the area where the plurality of obstacles contacts each other, according to the normal cleaning travel pattern.

As is apparent from the above description, in a robot cleaner and a control method thereof in accordance with one embodiment of the present disclosure, the traveling velocity of the robot cleaner is reduced through sensing of a corner in a cleaning travel mode and thus, a foreign substance removal time at the corner may be increased and cleaning efficiency may be improved, as compared to a conventional robot cleaner and control method thereof.

In a robot cleaner and a control method thereof in accordance with another embodiment of the present disclosure, if the robot cleaner approaches a corner, the robot cleaner is rotated in the direction of the corner and thus, cleaning efficiency at the corner through side brushes may be improved.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A robot cleaner comprising:
   a main body;
   a driving unit moving the main body in a traveling direction at a traveling velocity;
   a sensor unit sensing obstacles around the main body, the sensor unit including a front sensor and side sensors, the side sensors including a first side sensor and a second side sensor;
   a main brush unit formed on the main body;
   side brush units installed on both sides of a front portion of the main body; and
   a controller reducing the traveling velocity of the main body and causing the main body to approach a front obstacle when an area where a plurality of obstacles contacts each other is sensed through the sensor unit,
   wherein the controller includes
      a corner judgment unit judging that the area where a plurality of obstacles contacts each other is present in front of the main body when the front sensor and at least one of the first side sensor and the second side sensor simultaneously sense obstacles, and
      a travel pattern control unit rotating the main body by a predetermined angle in the direction of a corner where the plurality of obstacles contacts each other when the main body approaches the front obstacle, whereby one of the side brush units is rotated in the direction of the corner to further approach the corner.

2. The robot cleaner according to claim 1, wherein the front sensor senses an obstacle located in a front region in the traveling direction of the main body; and
   the side sensors sense obstacles located in side regions in the traveling direction of the main body.

3. The robot cleaner according to claim 2, wherein the first side sensor is formed on the left side surface among both side surfaces of the main body; and
   the second side sensor is formed on the right side surface among both side surfaces of the main body.

4. The robot cleaner according to claim 3, wherein the controller further includes:
   a traveling velocity control unit reducing the current traveling velocity to a predetermined velocity when the corner judgment unit judges that the area where a plurality of obstacles contacts each other is present in front of the main body.

5. The robot cleaner according to claim 4, wherein the reduced velocity is the velocity of a pattern in which a predetermined velocity is uniformly maintained or the velocity of a pattern in which a velocity is changed according to approach distances from the front obstacle.

6. The robot cleaner according to claim 5, wherein the travel pattern control unit rotates the main body by the predetermined angle in the leftward direction when the area where a plurality of obstacles contacts each other is located to the left of the traveling direction of the main body and rotates the main body by the predetermined angle in the rightward direction when the area where a plurality of obstacles contacts each other is located to the right of the traveling direction of the main body.

7. The robot cleaner according to claim 5, wherein the travel pattern control unit rotates the main body by the predetermined angle in one of the leftward direction and rightward direction and then rotates the main body by the predetermined angle in the other direction when the area where a plurality of obstacles contacts each other is located to both the left and the right of the traveling direction of the main body.

8. The robot cleaner according to claim 5, wherein the travel pattern control unit maintains the main body in the rotated state in the direction of the corner for a predetermined waiting time, and then travels the main body according to a normal cleaning travel pattern.

9. The robot cleaner according to claim 1, further comprising:
   a suction motor sucking foreign substances,
   wherein the controller further includes a driving control unit increasing driving force of at least one of a rotating speed of the side brush units, a suction force of the suction motor, and a rotating speed of the main brush unit when the sensor unit senses the area where a plurality of obstacles contacts each other in front of the main body.

10. The robot cleaner according to claim 9, wherein the side brush units are protrusion type side brush units or fixed type side brush units.

11. A control method of a robot cleaner comprising:
traveling a main body of the robot cleaner along a floor surface based on a normal cleaning travel pattern in a cleaning travel mode, the main body including a main brush unit formed on the main body and side brush units installed on both sides of a front portion of the main body;
sensing whether or not an area where a plurality of obstacles contacts each other is present in front of the main body through a sensor unit, the sensor unit including a front sensor and side sensors, the side sensors including a first side sensor and a second side sensor;
causing the main body to approach a front obstacle by reducing a traveling velocity when the area where a plurality of obstacles contacts each other is present, as a result of sensing; and
rotating the main body by a predetermined angle in the direction of a corner where the plurality of obstacles contacts each other, whereby one of the side brush units is rotated in the direction of the corner to further approach the corner.

12. The control method according to claim 11, wherein the front sensor senses an obstacle located in front of the main body and the side sensors sense obstacles located at sides of the main body, and the first side sensor is formed at the left side of the main body and the second side sensor is formed at the right side of the main body,
wherein, in the sensing of whether or not the area where a plurality of obstacles contacts each other is present, it is judged that the area where a plurality of obstacles contacts each other is present in front of the main body when the front sensor and at least one of the first side sensor and the second side sensor simultaneously sense obstacles.

13. The control method according to claim 11, wherein, in the approach to the front obstacle, the velocity of the main body is controlled so that the main body approaches the front obstacle under the condition that the main body uniformly maintains a predetermined velocity, or the velocity of the main body is controlled so that the velocity of the main body is changed according to approach distances from the front obstacle.

14. The control method according to claim 11, further comprising confirming whether or not a space in which the main body is rotatable in the direction of the corner is present, after the approach to the front obstacle and before the rotation of the main body by the predetermined angle,
wherein, when the space in which the main body is rotatable in the direction of the corner is present, as a result of confirmation, the rotation of the main body by the predetermined angle in the direction of the corner is performed.

15. The control method according to claim 11, wherein, in the rotation of the main body by the predetermined angle,
the main body is rotated by the predetermined angle in the leftward direction when the area where a plurality of obstacles contacts each other is located to the left of the traveling direction of the main body; and
the main body is rotated by the predetermined angle in the rightward direction when the area where a plurality of obstacles contacts each other is located to the right of the traveling direction of the main body.

16. The control method according to claim 11, wherein, in the rotation of the main body by the predetermined angle, the main body is rotated by the predetermined angle in one of the leftward direction and rightward direction and then rotated by the predetermined angle in the other direction when the area where a plurality of obstacles contacts each other is located to the left and the right of the traveling direction of the main body.

17. The control method according to claim 11, wherein the rotation of the main body by the predetermined angle includes:
maintaining the main body in the rotated state in the direction of the corner for a predetermined waiting time; and
traveling the main body according to a normal cleaning travel pattern when the predetermined waiting time has elapsed.

* * * * *